United States Patent
Rastelli et al.

(10) Patent No.: US 10,005,968 B2
(45) Date of Patent: Jun. 26, 2018

(54) PROCESS FOR REMOVING SULFUR COMPOUNDS FROM HYDROCARBON STREAMS

(71) Applicant: UOP LLC, Des Plaines, IL (US)

(72) Inventors: Henry Rastelli, Gurnee, IL (US); Jayant K. Gorawara, Buffalo Grove, IL (US); Stanley J. Frey, Palatine, IL (US); Kiran Bollapragada, Gurgaon (IN)

(73) Assignee: UOP LLC, Des Plaines, IL (US)

(*) Notice: Subject to any disclaimer, the term of this patent is extended or adjusted under 35 U.S.C. 154(b) by 0 days. days.

(21) Appl. No.: 15/268,420

(22) Filed: Sep. 16, 2016

(65) Prior Publication Data

US 2017/0073589 A1    Mar. 16, 2017

Related U.S. Application Data

(60) Provisional application No. 62/219,381, filed on Sep. 16, 2015.

(51) Int. Cl.

| | |
|---|---|
| *C10G 25/12* | (2006.01) |
| *B01J 20/18* | (2006.01) |
| *B01J 20/16* | (2006.01) |
| *B01J 20/34* | (2006.01) |
| *C10G 25/00* | (2006.01) |

(52) U.S. Cl.
CPC ............ *C10G 25/12* (2013.01); *B01J 20/165* (2013.01); *B01J 20/18* (2013.01); *B01J 20/3475* (2013.01); *C10G 25/003* (2013.01)

(58) Field of Classification Search
CPC ........ C10G 25/003; C10G 25/12; B01J 20/18; B01J 20/165; B01J 20/3475
See application file for complete search history.

(56) References Cited

U.S. PATENT DOCUMENTS

| | | | | |
|---|---|---|---|---|
| 3,660,967 | A * | 5/1972 | Collins ................. | B01D 53/02 95/137 |
| 4,935,580 | A * | 6/1990 | Chao ..................... | B01J 20/186 585/820 |
| 5,089,034 | A * | 2/1992 | Markovs ............... | B01D 53/04 95/123 |
| 5,164,076 | A * | 11/1992 | Zarchy .................. | C10G 25/05 208/134 |
| 2002/0084223 | A1 * | 7/2002 | Feimer .................. | B01J 20/165 210/660 |

OTHER PUBLICATIONS

A. B. S. H. Salem, Naphtha Desulfurization by Adsorption, 33 Ind. Eng. Chem. Res. 336-340 (1994).*
H. Faghihian et al., Desulfurization of Gas Oil by Modified Clinoptilolite, 26 Iran. J. Chem. Chem. Eng. 19-25 (2007).*

* cited by examiner

*Primary Examiner* — Randy Boyer

(57) ABSTRACT

A process is presented for the removal of contaminants like sulfur compounds from hydrocarbons. The sulfur compounds are removed from hydrocarbons that may be a feed to cracking units. A feed stream is treated with a clinoptilolite or a barium exchanged zeolite adsorbent to effectively remove carbon disulfides from the feed hydrocarbon. The adsorbent may be regenerated by a hydrogen stream, a hydrocarbon stream or a mixture thereof.

15 Claims, 3 Drawing Sheets

PROCESS FOR REMOVING SULFUR COMPOUNDS FROM HYDROCARBON STREAMS

CROSS-REFERENCE TO RELATED APPLICATION

This application claims priority from Provisional Application No. 62/219,381 filed Sep. 16, 2015, the contents of which are hereby incorporated by reference.

BACKGROUND

The present subject matter relates generally to methods for the removal of sulfur compounds from hydrocarbon streams. More specifically, the present subject matter relates to the methods for the removal of carbon disulfide from petrochemical grade naphtha fed to an ethylene plant, by use of selective adsorbents.

Hydrocarbons used by industry should be produced to be as pure as necessary without the presence of contaminants over specified limits. Conventionally, many of the organic sulfur compounds fed to an ethylene cracker decompose to form hydrogen sulfide. While some thermal decomposition of carbon disulfide occurs, the remaining carbon disulfide in the cracker remains unconverted. The petrochemical grade naphtha fed to the cracking unit has to meet the product specification limits of carbon disulfide for any further use. Therefore, there is a need to remove carbon disulfide contaminants from the petrochemical naphtha to meet the product specifications for commercial use.

The presence of carbon disulfide in the cracked stream also affects downstream processing. Carbon disulfide can poison the selective hydrogenation catalysts that are generally used to remove acetylenes and dienes in olefin plants. The noble metal catalysts are very sensitive to sulfur and degrade in the presence of sulfur contaminants. Carbon disulfide also contaminates C4 and C5 olefins and dienes production in polymer plants and can be corrosive when it undergoes transformation to H2S. Therefore, there is a need for a process for removal of carbon disulfide from the hydrocarbon streams.

In one prior art process, the cracked gas is directed to acid gas scrubber for caustic wash. The acidic contaminants and hydrogen sulfide are readily removed by caustic wash. However, carbon disulfide contaminants present in the gas are not effectively removed by caustic wash.

Carbon disulfide (CS2) is a contaminant found in refinery and condensate hydrocarbon streams and elutes with the light naphtha fraction. The concentration of CS2 in the naphtha fraction varies considerably, depending upon the source of the hydrocarbon stream. Typically, along with CS2 in these hydrocarbon streams are found other sulfur species sulfur as mercaptans, sulfides, and disulfides which usually are present in higher concentrations. When such CS2 containing naphtha streams are exported as feedstock to steam crackers (primarily for ethylene production), it can result in the production of off-spec C5 derivatives. This then affects the downstream production quality of, among other things, synthetic rubber. Normally, CS2 is present at very low levels (<10 ppm). Along with CS2 in these hydrocarbon streams are other sulfur species like mercaptans, sulfides, and disulfides which usually are in higher concentrations. Many hydrocarbon streams are treated with catalysts to change their form, such as, isomerizing, reforming, hydrocracking, etc. Sulfur and oxygen containing organic compounds deactivate these catalysts. Heretofore, the oxygenates (i.e. methanol, dimethyl ether, acetone, acetaldehyde, etc.) can be removed by adsorption easily with molecular sieves. The sulfur species mercaptans, sulfides, and substituted disulfides (dimethyldisulfide, methylethyldisulfide, diethyldisulfide etc.)) are removed by adsorption. However, CS2 is too light to normally be removed with conventional sulfur removing commercial adsorbents such as 13X, 4A, and 5A. Instead of removing the CS2, usually the sulfur specification can be met by removing all of the other sulfur species present, even though the CS2 passes through.

With the advent of lower sulfur specifications for fuels, even the presence of relatively low levels of CS2 cannot be ignored. Therefore, there is a need for an adsorbent that can effectively remove CS2 that is present at low levels (10-20 ppm). Normally, hydrocarbons adsorb more strongly than CS2 in conventional zeolites (4A, 5A, 13X) so an adsorbent is needed whose pore size is appropriate to allow CS2 to be adsorbed while excluding the hydrocarbons. In addition, carbon disulfide levels can also cause catalyst poisoning in other polymer plant feedstock production. As a consequence, petrochemical naphtha (PCN) users have moved to limit feed CS2 to <1-2 ppm.

SUMMARY

An embodiment of the subject matter is a process for removing sulfur compounds from hydrocarbon streams comprising contacting a hydrocarbon stream with a clinoptilolite adsorbent to remove carbon disulfide to produce an effluent stream. Sodium clinoptilolite and barium clinoptilolite were found to be very effective in removal of carbon disulfide.

A second embodiment of the subject matter is a process for removing sulfur compounds from hydrocarbon streams comprising an adsorbent bed in communication with a hydrocarbon stream to remove at least carbon disulfide from the product stream. The adsorbents comprise sodium clinoptilolite, barium clinoptilolite or mixtures thereof. The hydrocarbon stream may be sent to a hydrotreating unit which serves to reduce the sulfur, nitrogen, oxygenates and aromatic content of the hydrocarbon stream. A portion of the resulting treated hydrocarbon stream may be used to regenerate the adsorbent bed. This regenerant stream comprises mostly saturated hydrocarbons which are suitable for regeneration at elevated temperatures to avoid coking from condensation and/or reaction of unsaturates on the adsorbent. The regenerant stream may be recycled to the hydrotreater in the event that there are unsaturated hydrocarbons that are desorbed from the adsorbent during the regeneration process. The regenerant stream may also be sent to the hydrotreater for the CS2 to be treated in the hydrotreater. In an integration of the naphtha hydrotreater with the adsorbent bed, the stabilized naphtha hydrotreater bottom or naphtha splitter overhead stream can be used as a regeneration medium and the regeneration effluent can be directed to the hydrotreater feed. The advantage of using the stabilized naphtha hydrotreater effluent is to use the hot stream in order to minimize the energy needed for regeneration heating and the spent hot regeneration effluent can be directed to the combination with the hydrotreater feed upstream of the charge heater or reduce the overall energy requirement of the process. In other embodiments of the invention, the regeneration stream may be a hydrogen stream that after passing through the adsorbent bed may be sent to the hydrotreater, a hydrocracker or to another hydrogen consuming process.

These and other features, aspects, and advantages of the present subject matter will become better understood upon consideration of the following detailed description, drawings and appended claims.

DETAILED DESCRIPTION

Figure 1:
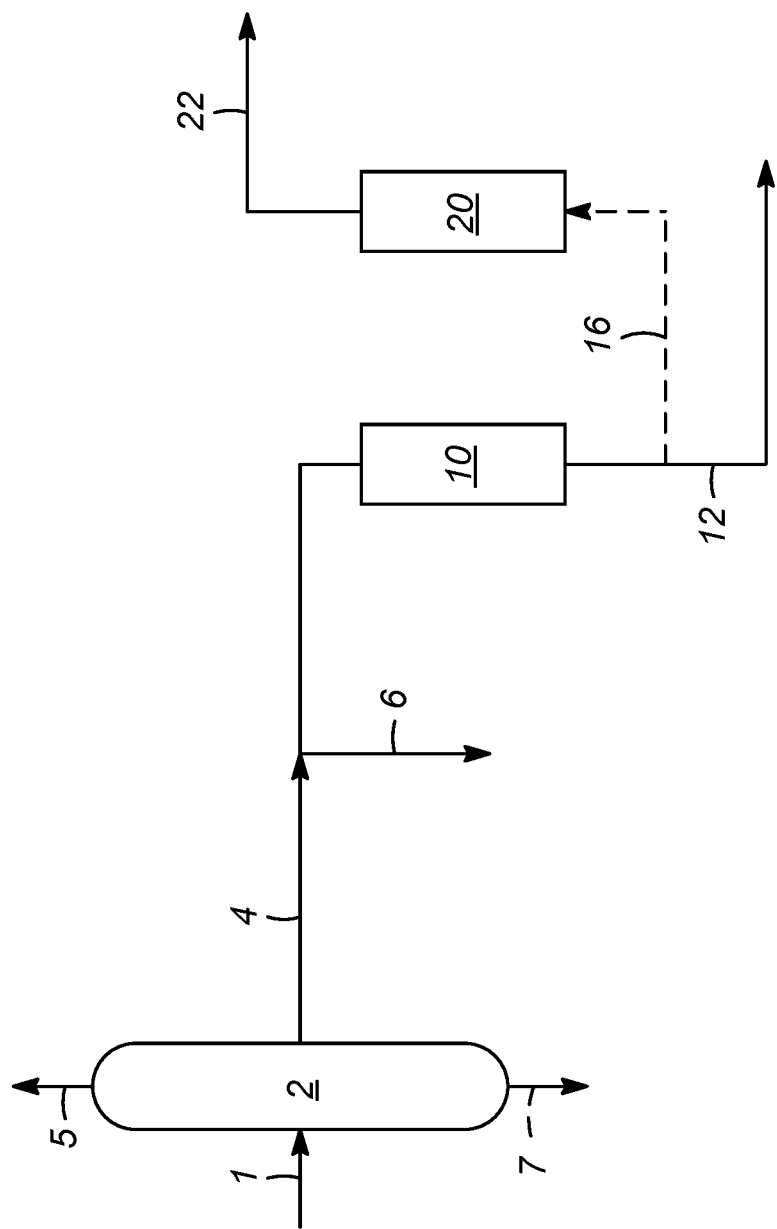
FIG. 1 shows a flow scheme with the regeneration stream that is a slip stream of the treated product stream from the adsorbent bed.

Naphtha from the crude distillation section is fed to ethylene cracking units for further processing. The crude naphtha may be contaminated with carbon disulfide. Carbon disulfide inhibits chemical reactions by deactivating the catalysts used for selective hydrogenation. Therefore, carbon disulfide is an undesirable contaminant that needs to be removed from the crude naphtha to meet the product specification of naphtha for commercial use.

Typically, contaminants are removed from the cracked hydrocarbons by caustic wash. The contaminants such as hydrogen sulfide and other acidic contaminants are removed readily from the cracked hydrocarbons by caustic wash. However, carbon disulfide is not effectively removed and is subsequently carried with the hydrocarbon to downstream fractionation and treating sections. This affects downstream processing and leads to undesirable reactions like fouling.

The present invention provides a new method to remove carbon disulfide from feed to ethylene cracking units by using a clinoptilolite adsorbent or a barium ion-exchanged zeolite to remove the carbon disulfide from the cracker feed. The benefit of this method is that the removal of carbon disulfide enables economical processing of the feedstock in cracking units. In addition, in an embodiment of the invention, the adsorbent bed may be regenerated by use of a hydrotreated hydrocarbon stream. This regeneration stream may first pass through the adsorbent bed to remove carbon disulfide as well as unsaturated hydrocarbons and then be sent back through the hydrotreater.

In the practice of the invention, an adsorbent column contains clinoptilolite adsorbent. The clinoptilolite adsorbent has exchangeable cations selected from ions of Group 1A, Group 2A, Group 3A, Group 3B, the lanthanide series and mixtures of these. The clinoptilolite is selected from natural clinoptilolite, synthetic clinoptilolite, sodium-exchanged clinoptilolite, potassium-exchanged clinoptilolite, lithium-exchanged clinoptilolite, calcium-exchanged clinoptilolite, magnesium-exchanged clinoptilolite, barium-exchanged clinoptilolite, and mixtures thereof. Preferably, the clinoptilolite is sodium-exchanged clinoptilolite or barium-exchanged clinoptilolite. In addition, it has been found that the adsorbent column may contain a natural or a synthetic zeolite having a chabazite or an erionite structure. Mixtures of chabazite, erionite and clinoptilolite adsorbents that are exchanged with sodium, potassium, lithium, calcium, magnesium or barium and mixtures thereof may be used. Preferably, the adsorbent is a chabazite, an erionite, a clinoptilolite or mixtures thereof that is exchanged with barium.

Clinoptilolites are a natural occurring zeolite comprising a microporous arrangement of silica and alumina tetrahedra. While it has been previously used for removal of some other impurities, it has not been previously known to be effective for the removal of carbon disulfide in naphtha boiling range feedstocks. An additional adsorbent layer or column may be used to remove other types of impurities.

A chabazite or an erionite zeolite has also been found effective in the present invention. A barium exchanged zeolite that has been found effective is a mineral zeolite that comprises approximately 50 wt % chabazite, 40 wt % erionite, 5 wt % clinoptilolite and the remainder amorphous material. This material is a barium exchanged version of adsorbent that may be 1/16" or 1/8" pellets or other configuration and has a general chemical formula of $M_x[(AlO_2)_x(SiO_2)_y].z\ H2O$ where [M=Na,K,Ca,Mg]. This material is barium exchanged.

The term "adsorption" as used herein encompasses the use of a solid support to remove atoms, ions, and molecules from a gas or liquid. The adsorption may be by "physisorption" in which the adsorption involves surface attractions or "chemisorptions" where there are actual chemical changes in the contaminant that is being removed. Either temperature swing adsorption or displacement process may be employed in regeneration of the adsorption process. A combination of the processes may also be used. The adsorbents may be any porous material known to have an application as an adsorbent including carbon materials such as activated carbon clays, molecular sieves including zeolites and metal organic frameworks (MOFs), metal oxides including silica gel and alumina that are promoted or activated, as well as other porous materials that can be used to remove or separate the contaminants.

There is also provided a process to reduce the CS2 content of petrochemical grade naphtha using a size selective adsorbent such as a barium, or sodium clinoptilolite. This is a cost effective option to allow refiners to meet the CS2 specification of petrochemical grade naphtha. Accomplishing the CS2 separation in this way overcomes the obstacles of interference and co-adsorption of not only the naphtha boiling range hydrocarbons, since these are excluded from the adsorbent pores, but additionally obviates the need to unnecessarily have to remove the other organic sulfur compounds, such as mercaptans or heavy oxygenates such as MTBE and TAME since they may compete with CS2 adsorption. This allows for design of adsorbent beds that are much smaller (more economical) than traditional adsorbents. While many adsorbents have been commercially used, and demonstrated to be suitable for carbon disulfide removal, the presence of other organic sulfur species such as mercaptans and sulfides in the stream along with hydrocarbon coadsorption will severely limit the adsorbent's CS2 capacity. Therefore it has not economically practical to remove CS2 from naphtha by using adsorbents.

The currently viable method to remove CS2 from naphtha is via the well-known hydrotreating option. In many cases the existing hydrotreating assets do not have sufficient available capacity to process the petrochemical naphtha stream and building a grass roots hydrotreater for this purpose is a very expensive (capital expense) option that cannot be justified. In addition, the hydrotreating option for CS2 removal will also result in much more hydrogen consumption than that required for CS2 removal alone, since there will be additional sulfur, oxygenate and nitrogen compounds that will be converted, in addition to aromatics saturation.

In one embodiment of reducing the proposed TSA (thermal swing adsorption) mode of operation to commercial practice is to use a slip stream of the product for regeneration of the beds. The TSA mode of operating adsorbents in order to continuously produce a treated stream is a well-known and commercially practiced technology. However, finding a suitable clean regeneration stream to regenerate the beds can be challenging and is one of the considerations that can make the adsorption option for purification economically disadvantageous. Integrating the regeneration stream into a refinery is not trivial, since this can made the process viable or uneconomical.

The regeneration effluent now contains CS2 and needs to be suitably disposed. One of the options for doing so is to send this much smaller stream typically 10-20% of the total feed processed to an existing naphtha hydrotreater, which should be able to accommodate a much smaller additional stream, as opposed to the complete petrochemical naphtha stream.

In another embodiment of process integration of the TSA unit, the stabilized naphtha hydrotreater bottom, or the naphtha splitter overhead stream can be used as a regeneration medium and the regeneration effluent can be directed to the hydrotreater feed. The advantage using the stabilized naphtha hydrotreater effluent is to use the 'hot' stream in order to minimize the energy required for regeneration heating and the spent hot regeneration effluent can be directed to the combine with the hydrotreater feed upstream of the charge heater or reduce the overall energy requirement of the process.

The adsorbent may be operated as a non-regenerative guard bed to polish the residual carbon disulfide present in the naphtha stream after a separate treatment to remove a portion. The petrochemical naphtha is removed from the bottom of the adsorbent column and has less than 1 wpprn carbon disulfide. The petrochemical naphtha may then be directly sent for cracking and further use.

The removal of carbon disulfide from naphtha by use of adsorption in a packed bed thermally regenerated system with the use of clinoptilolite adsorbents provides an effective removal of carbon disulfide of about 90% and preferably about 99% of the carbon disulfide from the crude naphtha. The crude naphtha used as feed for further cracking and other commercial uses is free of carbon disulfide and as a result avoids consequent undesirable downstream reactions like fouling or deactivation of catalysts.

The barium clinoptilolite shows an increased capacity for CS2 at the higher concentration. This result is counter intuitive since the barium cation is larger (atomic volume=38.21 cm3/mol) than the sodium cation (atomic volume=23.70 cm3/mol). Even taking into account the fact that barium is a divalent cation and therefore would only require ½ as many cations to balance the zeolite surface charge as sodium cations, the CS2 capacity should only be increased by the ratio of the atomic volumes ((23.70/(38.21/2))=1.24. Instead the CS2 capacity at the high end is almost twice the amount (3.001/1.553=1.93). Apparently, the barium cation has the ability to modify the pore shape to increase the volume available for molecules like CS2. This is a surprising result as shown in the results in the Table.

In Table 1, the results for several different adsorbents in removing 400 ppm carbon disulfide from n-heptane are shown. The barium clinoptilolite and the sodium clinoptilolite performed much better in removing carbon disulfide than any of the other adsorbents.

TABLE 1

| Sample | Test # | Liquid Wt (g) | Sample Wt (g) | Liq/Sol g/g | Feed Conc. ppm | Conc Ppm | Loading wt % |
|---|---|---|---|---|---|---|---|
| 3A zeolite (K exchanged) | 2A | 50.00 | 0.26 | 1.9E+02 | 452 | 428 | 0.462 |
| | 2B | 20.65 | 0.52 | 39.7 | 452 | 414 | 0.151 |
| | 2C | 10.09 | 1.04 | 9.7 | 452 | 410 | 0.041 |
| Ba Clino | 3A | 50.00 | 0.26 | 1.9E+02 | 452 | 296 | 3.001 |
| | 3B | 20.01 | 0.53 | 37.8 | 452 | 36 | 1.571 |
| | 3C | 10.03 | 1.00 | 10.0 | 452 | 7 | 0.041 |
| Na Clino | 4A | 51.12 | 0.27 | 1.9E+02 | 452 | 370 | 1.553 |
| | 4B | 20.16 | 0.51 | 39.5 | 452 | 88 | 1.439 |
| | 4C | 10.00 | 1.00 | 10.0 | 452 | 17 | 0.435 |
| Open pore 3A | 5B | 20.00 | 0.51 | 39.2 | 452 | 407 | 0.176 |
| | 5C | 10.03 | 1.00 | 10.0 | 452 | 384 | 0.068 |

In Table 2 is shown the results with the barium exchanged adsorbent that is a mixture of about 50 wt % chabazite, 40 wt % erionite and 5 wt % clinoptilolite (remainder amorphous material) with a first run followed by two different runs using an adsorbent bed that has been regenerated. The feed that was treated with this adsorbent contained 200 ppm carbon disulfide, 200 ppm C3H7SH in a mixture of n-hexane, n-heptane, iso-octane and toluene.

TABLE 2

| Sample | Run # | Test # | Liquid wt. (g) | Sample wt. (g) | Liq./Sol. g/g | Feed Conc (XRF) ppm | CS2 in Feed as S (GC) ppm | Total CS2 (feed) ppm | C3H7SH in feed as S (GC) ppm | Total C3H7SH in feed ppm |
|---|---|---|---|---|---|---|---|---|---|---|
| Ba zeolite | 1 | A | 15.73 | 0.11 | 1.5E+02 | 265 | 172 | 204 | 92 | 219 |
| | | B | 15.41 | 0.16 | 9.9E+01 | 265 | 172 | 204 | 92 | 219 |
| | | C | 15.53 | 0.20 | 7.6E+01 | 265 | 172 | 204. | 92 | 219 |
| | | D | 15.12 | 0.30 | 5.0E+01 | 265 | 172 | 204 | 92 | 219 |
| | | E | 15.69 | 0.76 | 2.1E+01 | 265 | 172 | 204 | 92 | 219 |
| | | F | 15.46 | 1.01 | 1.5E+01 | 265 | 172 | 204 | 92 | 219 |
| | | G | 15.24 | 1.51 | 1.0E+01 | 265 | 172 | 204 | 92 | 219 |
| Ba exchanged zeolite | 1 Regen #1 | A1 | 15.42 | 0.11 | 1.5E+02 | 265 | 170 | 202 | 95 | 226 |
| | | B1 | 15.40 | 0.16 | 9.7E+01 | 265 | 170 | 202 | 95 | 226 |
| | | C1 | 15.62 | 0.21 | 7.6E+01 | 265 | 170 | 202 | 95 | 226 |
| | | D1 | 15.88 | 0.30 | 5.3E+01 | 265 | 170 | 202 | 95 | 226 |
| | | E1 | 15.50 | 0.75 | 2.1E+01 | 265 | 170 | 202 | 95 | 226 |
| | | F1 | 15.84 | 1.00 | 1.6E+01 | 265 | 170 | 202 | 95 | 226 |
| | | G1 | 15.63 | 1.48 | 1.1E+01 | 265 | 170 | 202 | 95 | 226 |
| Ba exchanged zeolite | 1 Regen #2 | A2 | 15.61 | 0.11 | 1.5E+02 | 265 | 170 | 202 | 95 | 226 |
| | | B2 | 15.11 | 0.16 | 9.5E+01 | 265 | 170 | 202 | 95 | 226 |
| | | C2 | 15.65 | 0.21 | 7.6E+01 | 265 | 170 | 202 | 95 | 226 |
| | | D2 | 15.62 | 0.30 | 5.2E+01 | 265 | 170 | 202 | 95 | 226 |

TABLE 2-continued

|  |  |  | | | | | | |
|---|---|---|---|---|---|---|---|---|
|  | E2 | 15.33 | 0.75 | 2.0E+01 | 265 | 170 | 202 | 95 | 226 |
|  | F2 | 15.16 | 1.00 | 1.5E+01 | 265 | 170 | 202 | 95 | 226 |
|  | G2 | 15.22 | 1.48 | 1.0E+01 | 265 | 170 | 202 | 95 | 226 |

| | | | Adsorption | | | | | |
|---|---|---|---|---|---|---|---|---|
| Sample | Run # | Test # | Unknown + heavies in feed as S (GC) ppm | Total S in Sample (XRF) ppm | CS2 as S (GC) ppm | Total CS2 ppm | C3H7SH as S (GC) ppm | Total C3H7SH ppm |
| Ba zeolite | 1 | A | 0 | 155 | 88 | 104 | 47 | 111 |
|  |  | B | 0 | 130 | 65 | 78 | 35 | 83 |
|  |  | C | 0 | 108 | 52 | 61 | 27 | 64 |
|  |  | D | 0 | 77 | 32 | 38 | 12 | 28 |
|  |  | E | 0 | 45 | 13 | 15 | 3 | 6 |
|  |  | F | 0 | 48 | 7 | 8 | 0 | 0 |
|  |  | G | 0 | 38 | 13 | 15 | 3 | 6 |
| Ba exchanged zeolite | 1 Regen #1 | A1 | 0 | 184 | 106 | 125 | 59 | 140 |
|  |  | B1 | 0 | 159 | 87 | 104 | 48 | 114 |
|  |  | C1 | 0 | 126 | 62 | 74 | 36 | 86 |
|  |  | D1 | 0 | 89 | 33 | 39 | 19 | 45 |
|  |  | E1 | 0 | 49 | 12 | 14 | 5 | 12 |
|  |  | F1 | 0 | 43 | 11 | 13 | 6 | 13 |
|  |  | G1 | 0 | 38 | 12 | 14 | 5 | 12 |
| Ba exchanged zeolite | 1 Regen #2 | A2 | 0 | 185 | 109 | 129 | 57 | 135 |
|  |  | B2 | 0 | 167 | 88 | 105 | 42 | 100 |
|  |  | C2 | 0 | 145 | 73 | 86 | 40 | 95 |
|  |  | D2 | 0 | 98 | 35 | 41 | 20 | 48 |
|  |  | E2 | 0 | 52 | 12 | 14 | 2 | 5 |
|  |  | F2 | 0 | 58 | 19 | 22 | 7 | 16 |
|  |  | G2 | 0 | 0 |  | 0 |  | 0 |

| | | | Other Sulfur Species | | | Loading | | | | |
|---|---|---|---|---|---|---|---|---|---|---|
| Sample | Run # | Test # | C6H14S2 as S (GC) ppm | Total C6H14S2 ppm | Other S species (GC) ppm | Total S Loading wt % | CS2 loading as S wt % | Total CS2 Loading wt % | C3H7SH loading as S wt % | Total C3H7SH loading wt % |
| Ba zeolite | 1 | A | 20 | 47 | 0 | 1.615 | 1.237 | 1.469 | 0.670 | 1.591 |
|  |  | B | 29 | 68 | 1 | −1.282 | 1.053 | 1.250 | 0.567 | 1.346 |
|  |  | C | 29 | 68 | 0 | −0.821 | 0.917 | 1.089 | 0.497 | 1.181 |
|  |  | D | 33 | 77 | 1 | −0.386 | 0.703 | 0.835 | 0.404 | 0.958 |
|  |  | E | 29 | 68 | 0 | −0.093 | 0.330 | 0.392 | 0.187 | 0.443 |
|  |  | F | 40 | 94 | 1 | −0.074 | 0.253 | 0.301 | 0.142 | 0.337 |
|  |  | G | 22 | 52 | 0 | −0.038 | 0.161 | 0.191 | 0.091 | 0.216 |
| Ba exchanged zeolite | 1 Regen #1 | A1 | 19 | 44 | 1 | −2.695 | 0.945 | 1.122 | 0.526 | 1.249 |
|  |  | B1 | 23 | 55 | 1 | −1.544 | 0.804 | 0.955 | 0.458 | 1.087 |
|  |  | C1 | 27 | 64 | 0 | −0.959 | 0.821 | 0.975 | 0.446 | 1.059 |
|  |  | D1 | 36 | 84 | 2 | −0.469 | 0.725 | 0.860 | 0.400 | 0.950 |
|  |  | E1 | 31 | 73 | 1 | −0.101 | 0.325 | 0.386 | 0.185 | 0.440 |
|  |  | F1 | 26 | 61 | 0 | −0.068 | 0.253 | 0.300 | 0.142 | 0.337 |
|  |  | G1 | 21 | 48 | 0 | −0.040 | 0.167 | 0.198 | 0.095 | 0.226 |
| Ba exchanged zeolite | 1 Regen #2 | A2 | 18 | 42 | 1 | −2.724 | 0.898 | 1.066 | 0.559 | 1.329 |
|  |  | B2 | 29 | 67 | 8 | −1.584 | 0.778 | 0.924 | 0.503 | 1.194 |
|  |  | C2 | 32 | 74 | 1 | −1.095 | 0.735 | 0.873 | 0.417 | 0.990 |
|  |  | D2 | 42 | 97 | 2 | −0.507 | 0.700 | 0.832 | 0.387 | 0.919 |
|  |  | E2 | 38 | 88 | 1 | −0.106 | 0.323 | 0.383 | 0.189 | 0.449 |
|  |  | F2 | 32 | 75 | 0 | −0.088 | 0.229 | 0.272 | 0.134 | 0.317 |
|  |  | G2 |  | 0 | 0 | 0.000 | 0.174 | 0.207 | 0.097 | 0.231 |

FIG. 1 shows a flow scheme in which the regeneration stream is a slip stream of the product stream from the temperature swing adsorption bed that removes the CS2 impurities. A stream 1 that is a crude or condensate stream containing a full range of hydrocarbons is sent to a crude column 2 to produce a straight run naphtha stream 4. The crude column 2 sends alight stream 5 and a heavy stream 7 that are separately processed. A portion of straight run naphtha stream 4 is shown as stream 6 that is sent to other users that do not require the $CS_2$ impurities to he removed and the rest of straight run naphtha stream 4 is sent to a temperature swing adsorption bed 10 that contains a clinoptilolite adsorbent. This bed operates at temperatures between about 15.5 to 65.5° C. (60-150° F.). A purified product stream 12 exits the bottom of temperature swing adsorption bed 10 with about 80-90% of this treated product stream being sent to an ethylene cracker. About 10-20% of this product stream is sent in slip stream 16 to a temperature swing adsorption bed 20 that needs regeneration that takes place at temperatures from about 148.9 to 287.8° C. (300 to 550° F.). A stream 22 exits the top of temperature swing adsorption bed 20 to be sent to a naphtha hydrotreater (not shown). Since this stream 22 is a small fraction of the product stream, the naphtha hydrotreater has the capacity to treat the impurities in this stream.

Figure 2:
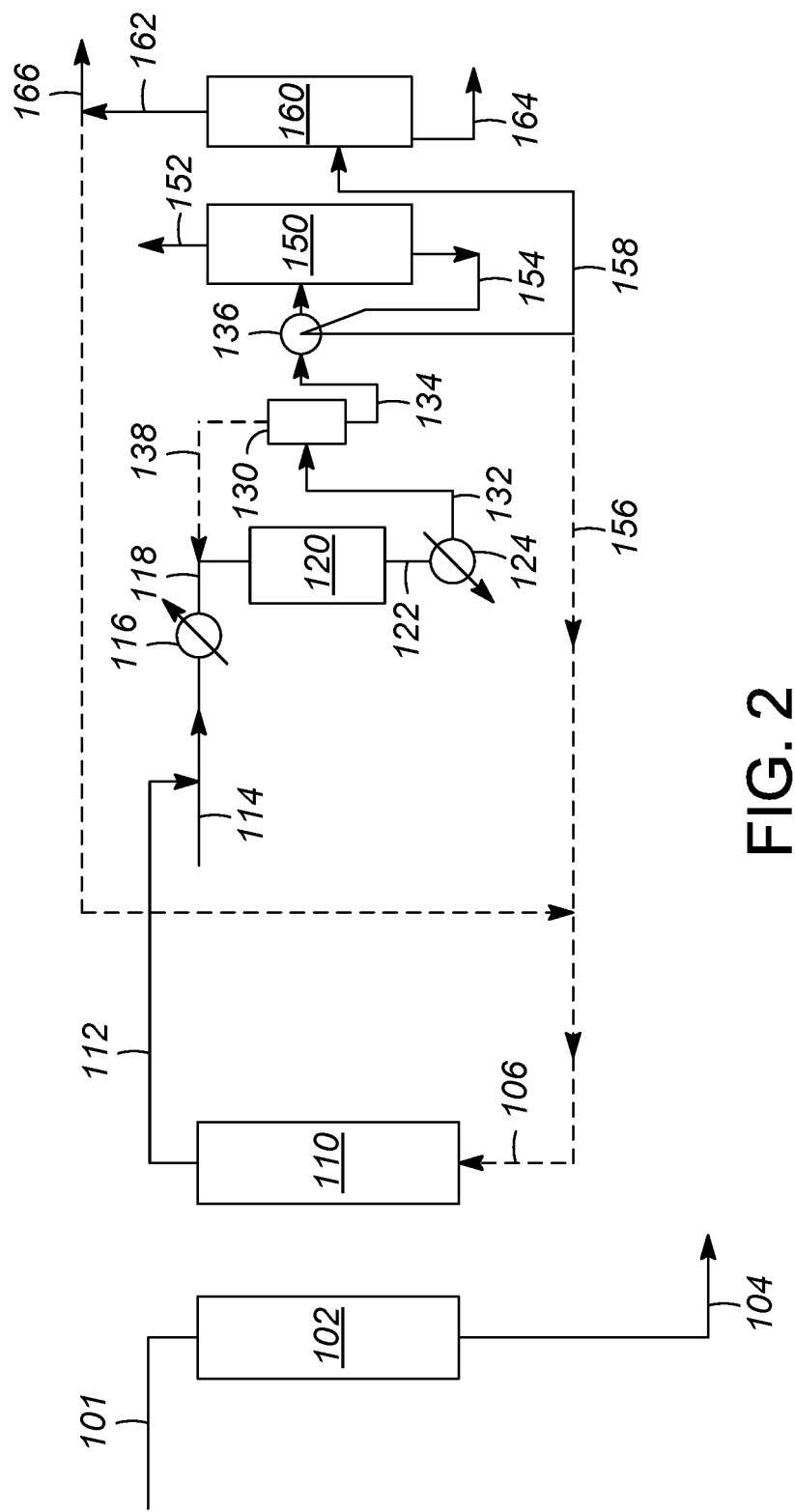
FIG. 2 shows two options for sending a regeneration stream to the adsorbent bed that has been treated in a hydrotreater.

FIG. 2 shows two additional embodiments of the invention for treating a straight run naphtha stream with the adsorbents used in the present invention and regenerating the adsorbent bed. A straight run naphtha feed 101 is sent to a temperature swing adsorption bed 102 that contains the adsorbents used in the present invention and a treated product stream 104 is then sent to an ethylene plant to be used as feed stream. The remainder of FIG. 2 describes the flow scheme related to the desorption portion of the TSA process. A regeneration stream 106 that is about 148.9 to 287.8° C. (300 to 550° F.) is sent to TSA bed 110 that is being regenerated. A stream 112 that contains the impurities removed from TSA bed 110 is then sent to a hydrotreater 120. Stream 112 is first added to a make-up hydrogen stream 114 that is heated by heat exchanger 116 and then the heated stream 118 is sent to hydrotreater 120. The effluent 122 then is cooled at heat exchanger 124 and sent to separator 130 to remove light ends in stream 132 including hydrogen to be recycled to hydrotreater 112. A bottoms naphtha stream 134 is heated in a bottoms heat exchanger 136 and sent to naphtha stabilizer 150. A light ends stream 152 that includes H2S and H2O is removed and a bottoms stream 154 is removed and passes through bottoms heat exchanger 136. A portion of the heated bottoms stream may be sent in stream 156 to regenerate TSA bed 110 and the remainder of the heated bottoms stream may be sent in stream 158 to naphtha splitter 160 which produces a light naphtha stream 162 and a heavy naphtha stream 164. A portion 162 of light naphtha stream may be sent to regenerate TSA bed 110 with the remainder of the light naphtha stream in stream 166. In the process, the regeneration stream is first heated to the desired temperature range between about 148.9 to 287.8° C. (300 to 550° F.) and preferably 93.3-204.4° C. (200-400° F.).

Figure 3:
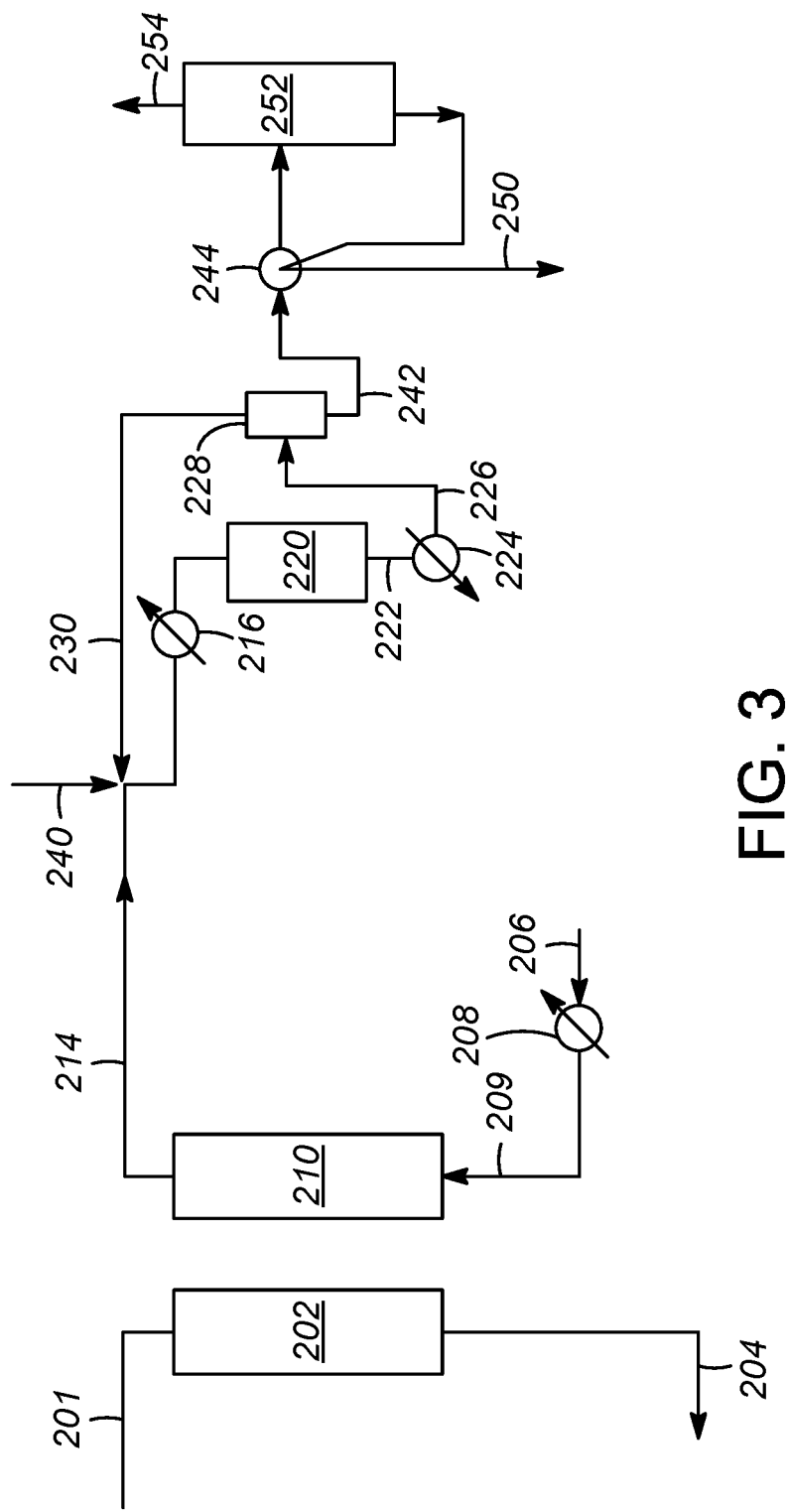
FIG. 3 shows an option to use part or all of a make-up hydrogen stream to an existing hydrotreater as the regeneration medium for the adsorbent bed.

FIG. 3 shows the use of the make-up hydrogen stream to a hydrotreater being used as the regeneration medium for the adsorbent beds in the present invention. A straight run naphtha feed 201 is sent to a temperature swing adsorption bed 202 that contains the adsorbents used in the present invention and a treated product stream 204 is then sent to an ethylene plant to be used as feed stream. The remainder of FIG. 3 describes the flow scheme related to the desorption portion of this TSA process. A regeneration stream 206 comprising hydrogen is heated at heat exchanger 208 with the resulted heated hydrogen stream 209 going through TSA bed 210 that is being regenerated. A hydrogen stream 214 then exits TSA bed 210 and together with naphtha stream 240 is heated by heat exchanger 216 and enters hydrotreater 220. An effluent 222 is then cooled at heat exchanger 224 and cooled stream 226 is sent to separator 228 to remove light ends in stream 226. A recycle stream 138 containing hydrogen is returned to hydrotreater 220 while a bottoms naphtha stream 242 is sent through bottoms heat exchanger 244 to separate a heavy naphtha stream 250 with the remainder of the naphtha stream being sent to naphtha splitter 252 with light ends 254 exiting the top of naphtha splitter 252 and the remainder exiting the bottom of naphtha splitter 252 to be combined with heavy naphtha stream 250. In other embodiments of the invention, the hydrogen may be sent to a hydrocracker or another hydrogen consumption process.

While the subject matter has been described with what are presently considered the preferred embodiments, it is to be understood that the subject matter is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is a process for removing CS2 from hydrocarbon streams comprising contacting a hydrocarbon stream with a clinoptilolite adsorbent or a barium exchanged zeolite adsorbent to produce a hydrocarbon stream having a reduced CS2 content. An embodiment of the invention is one, any or all of prior embodiments in this paragraph up through the first embodiment in this paragraph, wherein the hydrocarbon stream comprises naphtha boiling range hydrocarbons. An embodiment of the invention is one, any or all of prior embodiments in this paragraph up through the first embodiment in this paragraph wherein the hydrocarbon stream comprises straight run naphtha from crude oil or natural gas condensate sources. An embodiment of the invention is one, any or all of prior embodiments in this paragraph up through the first embodiment in this paragraph, wherein the clinoptilolite adsorbent or the barium exchanged zeolite adsorbent has exchangeable cations selected from ions of Group 1A, Group 2A, Group 3A, Group 3B, the lanthanide series and mixtures of these. An embodiment of the invention is one, any or all of prior embodiments in this paragraph up through the first embodiment in this paragraph, wherein the clinoptilolite adsorbent or the barium exchanged zeolite adsorbent is selected from natural clinoptilolite, synthetic clinoptilolite, sodium-exchanged clinoptilolite, potassium-exchanged clinoptilolite, lithium-exchanged clinoptilolite, calcium-exchanged clinoptilolite, magnesium-exchanged clinoptilolite, barium-exchanged clinoptilolite, and mixtures thereof. An embodiment of the invention is one, any or all of prior embodiments in this paragraph up through the first embodiment in this paragraph, wherein the clinoptilolite adsorbent or the barium exchanged zeolite adsorbent is sodium-exchanged clinoptilolite or barium-exchanged clinoptilolite. An embodiment of the invention is one, any or all of prior embodiments in this paragraph up through the first embodiment in this paragraph, further comprising contacting the hydrocarbon stream having a reduced CS2 content with a zeolite adsorbent or a promoted alumina adsorbent to remove at least one impurity selected from the group consisting of oxygenates and other sulfur compounds. An embodiment of the invention is one, any or all of prior embodiments in this paragraph up through first embodiment in this paragraph, wherein the clinoptilolite adsorbent or the barium exchanged zeolite adsorbent is used in a temperature swing adsorption system where the adsorption temperature is between 60-150° F. and the regeneration temperature is between 300 and 550° F. An embodiment of the invention is one, any or all of prior embodiments in this paragraph up through the first embodiment in this paragraph, further comprising regenerating the clinoptilolite adsorbent or the barium exchanged zeolite adsorbent with a portion of the hydrocarbon stream having a reduced CS2 content, a hydrogen stream or a mixture of said hydrocarbon stream having a reduced $CS_2$ content and hydrogen. An embodiment of the invention is one, any or all of prior embodiments in this paragraph up through the first embodiment in this paragraph, where a regeneration effluent stream is directed to a hydrotreater, a hydrocracker or another hydrogen consumption process. An embodiment of the invention is one, any or all of prior embodiments in this paragraph up through the first embodiment in this paragraph wherein the clinoptilolite adsorbent or the barium exchanged zeolite adsorbent is regenerated with a hydrocarbon stream that was first sent through a hydrotreater. An embodiment of the invention is one, any or all of prior embodiments in this paragraph up through the first embodiment in this paragraph where the regenerant stream is a hydrotreated naphtha stream available at a temperature of 15.5-287.8° C. (60-550° F.). An embodiment of the invention is one, any or all of prior embodiments in this paragraph up through the first embodiment in this paragraph wherein the regenerant stream is at a temperature from about 148.9-287.8° C. (300-550° F.). An embodiment of the invention is one, any or all of prior embodiments in this paragraph up through the first embodiment in this paragraph where the regenerant stream is a light hydrotreated naphtha from a naphtha splitter overhead at a temperature of 15.5-287.8° C. (60-550° F.). An embodiment of the invention is one, any or all of prior embodiments in this paragraph up through the first embodiment in this paragraph where the regenerant stream is alight hydrotreated naphtha from a naphtha splitter overhead at a temperature of 93.3-204.4= C. (200-400° F.). An embodiment of the invention is one, any or all of prior embodiments in this paragraph up through the first embodiment in this paragraph, where the regeneration effluent is directed to a hydrotreater at a temperature of 15.5-287.8° C. (60-550° F.) An embodiment of the invention is one, any or all of prior embodiments in this paragraph up through the first embodiment in this paragraph wherein the regeneration effluent is at a temperature of 148.9-287.8° C. (300-550° F.).

A second embodiment of the invention is a process for removing $CS_2$ from hydrocarbon streams comprising contacting a hydrocarbon stream with a zeolite adsorbent comprising a chabazite zeolite, an erionite zeolite, a clinoptilolite zeolite or mixtures thereof to produce a hydrocarbon stream having a reduced $CS_2$ content. An embodiment of the invention is one, any or all of prior embodiments in this paragraph up through the first embodiment in this paragraph, wherein the adsorbent is ion exchanged with barium. An embodiment of the invention is one, any or all of prior embodiments in this paragraph up through the first embodiment in this paragraph, wherein the zeolite adsorbent is regenerated with a regeneration stream comprising a portion of said hydrocarbon stream having a reduced $CS_2$ content, a hydrogen stream or a mixture of said hydrocarbon stream having a reduced $CS_2$ content and hydrogen.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for removing $CS_2$ from hydrocarbon streams comprising contacting a hydrocarbon stream with a clinoptilolite adsorbent or a barium exchanged zeolite adsorbent to produce a hydrocarbon stream having a reduced $CS_2$ content and regenerating said clinoptilolite adsorbent or barium exchanged zeolite adsorbent with a regeneration stream comprising a portion of said hydrocarbon stream having a reduced $CS_2$ content, a hydrogen stream or a mixture of said hydrocarbon stream having a reduced $CS_2$ content and hydrogen and producing a regeneration effluent stream wherein the regeneration effluent stream is directed to a hydrotreater, or a hydrocracker or other hydrogen consumption process.

2. The process of claim 1, wherein the hydrocarbon stream comprises naphtha boiling range hydrocarbons.

3. The process of claim 1 wherein the hydrocarbon stream comprises straight run naphtha from crude oil or natural gas condensate sources.

4. The process of claim 1, wherein said clinoptilolite adsorbent or barium exchanged zeolite adsorbent has exchangeable cations selected from ions of Group 1A, Group 2A, Group 3A, Group 3B, the lanthanide series and mixtures of these.

5. The process of claim 1, wherein said clinoptilolite adsorbent or barium exchanged zeolite adsorbent is selected from natural clinoptilolite, synthetic clinoptilolite, sodium-exchanged clinoptilolite, potassium-exchanged clinoptilolite, lithium-exchanged clinoptilolite, calcium-exchanged clinoptilolite, magnesium-exchanged clinoptilolite, barium-exchanged clinoptilolite, and mixtures thereof.

6. The process of claim 1, wherein said clinoptilolite adsorbent or barium exchanged zeolite adsorbent is sodium-exchanged clinoptilolite or barium-exchanged clinoptilolite.

7. The process of claim 1, further comprising contacting said hydrocarbon stream having a reduced $CS_2$ content with a zeolite adsorbent or a promoted alumina adsorbent to remove at least one impurity selected from the group consisting of oxygenates and other sulfur compounds.

8. The process of claim 1, wherein said clinoptilolite adsorbent or barium exchanged zeolite adsorbent is used in a temperature swing adsorption system operating at an adsorption temperature between 60° and 150° F. and a regeneration temperature between 300° and 550° F.

9. The process of claim 1 wherein said clinoptilolite adsorbent or barium exchanged zeolite adsorbent is regenerated with a hydrocarbon regenerant stream that was first sent through a hydrotreater.

10. The process of claim 9 where the regenerant stream is a hydrotreated naphtha stream available at a temperature of 15.5° to 287.8° C. (60° to 550° F.).

11. The process of claim 10 wherein the regenerant stream is at a temperature from about 148.9° to 287.8° C. (300° to 550° F.).

12. The process of claim 9 where the regenerant stream is a light hydrotreated naphtha from a naphtha splitter overhead at a temperature of 15.5° to 287.8° C. (60° to 550° F.).

13. The process of claim 9 where the regenerant stream is a light hydrotreated naphtha from a naphtha splitter overhead at a temperature of 93.3° to 204.4° C. (200° to 400° F.).

14. The process of claim 9, where the regeneration effluent is directed to a hydrotreater at a temperature of 15.5° to 287.8° C. (60° to 550° F.).

15. The process of claim 14 wherein the regeneration effluent is at a temperature of 148.9° to 287.8° C. (300° to 550° F.).

* * * * *